Oct. 6, 1970
M. SIMPSON ET AL
3,532,342
CHECKER-TYPE GAME WITH VARIOUSLY COLORED
TRANSPARENT SQUARES AND PLAYING PIECES
Filed Aug. 27, 1968
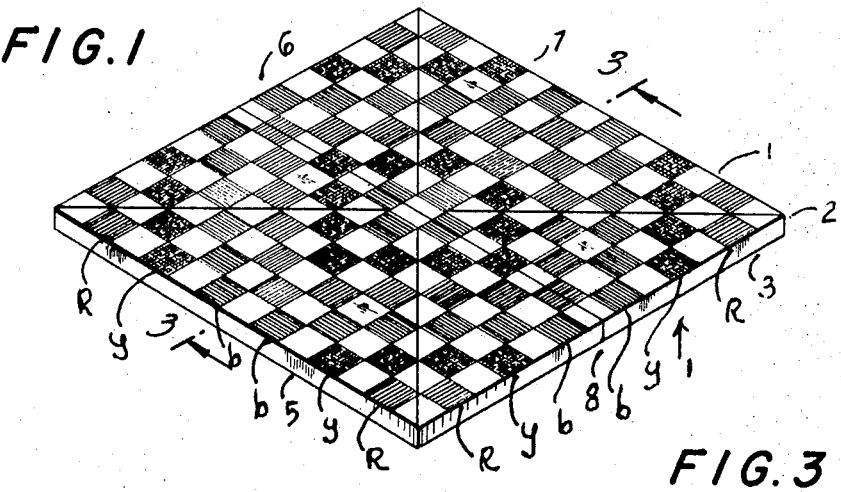
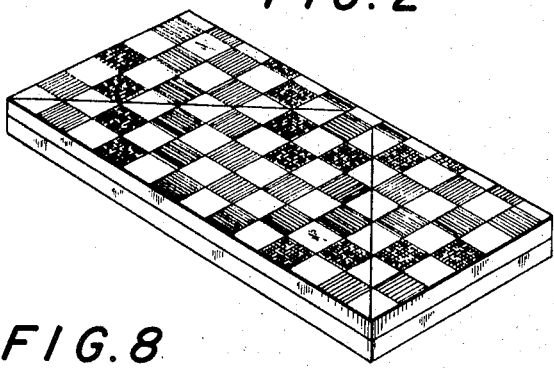
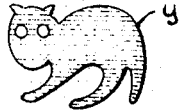
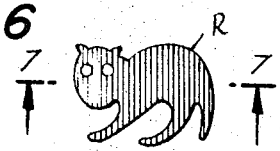
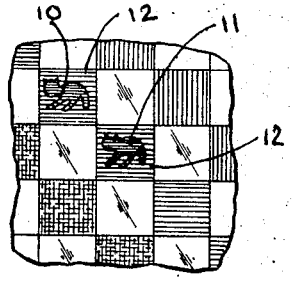
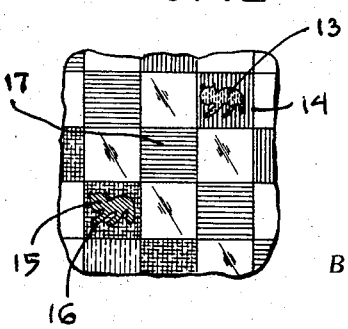
INVENTOR.
MARGUERITE SIMPSON
FRANCES S. GRAYS
BY
*Jallians V. Pesce*
ATTORNEY United States Patent Office 3,532,342
Patented Oct. 6, 1970

3,532,342
CHECKER-TYPE GAME WITH VARIOUSLY COLORED TRANSPARENT SQUARES AND PLAYING PIECES
Marguerite Simpson and Frances S. Grays, both of 137—51 Southgate St., Springfield Gardens, N.Y. 11413
Filed Aug. 27, 1968, Ser. No. 755,683
Int. Cl. A63f 3/02
U.S. Cl. 273—131        5 Claims

ABSTRACT OF THE DISCLOSURE

A checker-type game comparable to a checker-board game wherein a transparent supportable flat surface has disposed thereon a plurality of transparent colored squares arranged in checker-board fashion with each row containing successively red, yellow and blue squares each separated by white squares. Comparable transparent colored playing pieces are arranged to be moved about its board so as to produce different color combinations and permit jumps when two abutting squares contain objects that are of the same color produced by the correct color combination of color chek and color object.

---

The usual checker-board game involves movement of opaque checkers on an opaque black and white configured board and its relative movement of checkers and board in the usual checker play.

However in the present invention, play involves the use of colored objects in proximity to colored cheks or squares so that if their combined colors are the same the object is hard to detect, and if different the result is a color different than either when taken singly in that different color combinations may be effected. Thus, a unique color control and display is effected in a game that is simple and pleasant to play. The game thus is played not only as in the usual checker type play, but also provides a scheme for producing color combinations in a calculated fashion and renders a pleasant way to learn about different color combinations, and a method of producing same. The colors used are the regular primary types such as red, yellow and blue, and the moving objects are arranged to have the same colors.

This it is a principal object of the invention to provide an improved checker type of game.

Another object of the invention is to provide a game using color combinations so as to render different colors than the original color provided.

A still further object is to provide a checker-board type of game using different primary color chek areas, and comparable primary colored checkers so that the superposition of one with the other in different combinations produces colors of varying degrees.

A still further object of the invention is to provide an educational game which provides simple and pleasant means for producing and teaching varying color combinations to the players during the play of said game.

And a still further object of the invention is to provide a transparent checker board game that is played through the intermixing of three basic primary colors red, yellow and blue between board and playing pieces so as to change the said pieces into binary colors of orange, green and purple.

Other objects and advantages will become apparent from a reading of the specifications and a study of the accompanying drawings and wherein:

FIG. 1 is a perspective view of a color-chek game according to the invention;

FIG. 2 is a perspective of the color-chek game when folded or collapsed;

FIG. 3 is a section through the line 3—3 of FIG. 1;

FIGS. 4, 5 and 6 show chameleons in different colors, blue, yellow and red used as playing pieces;

FIG. 7 is a section through the line 7—7 of FIG. 6;

FIGS. 8 and 10 show transparent-faced checkers useful for playing the game;

FIG. 9 is a section through the line 9—9 of FIG. 8;

FIG. 11 shows two colored cats on blue squares; and

FIG. 12 shows same colored cats wherein one is moved to a yellow square and the other to a red square.

Now describing the invention with respect to the various figures there is shown in FIG. 1 a color-chek game comprising a rectangular board 1, box-like in configuration having a transparent lucite-like surface board 2 and a white opaque supporting plastic base board 3. The upper or surface board 2 is configured in checker-board fashion with however each row repetitively having successively red, yellow and blue squares, each being separated by a white square, the bottom of the board providing the white squares effect. The board is divided into separate triangular sections 5, 6, 7 and 8 with each section being identical so as to accommodate in the aggregate four separate players. All of the colored squares or cheks are transparent so as to permit the penetration of light therethrough.

FIGS. 4, 5 and 6 are identical cat-like or chameleon transparent plastic figures each of a different color and preferably blue, yellow and red, respectively. They are objects which must be manipulated along the color-chek board to carry out the objectives of the game. For example, the blue cat when placed on a blue chek or square appears hidden because of the manner in which the colors blend into each other. However, the same blue cat when placed in either a red or yellow chek square yields purple and green colors, respectively. Similarly, a red cat on a yellow and blue chek yields orange and purple colors, respectively. Finally, a yellow cat on blue and red cheks yields green and orange colors, respectively. Thus the objective is to manipulate the colored cats in such a fashion on the board as to yield different color combinations. Whenever a pair of cats appears on two colored cheks adjacent to each other in checker-board fashion, and the cats appear to be of the same color, through the combination of colors developed, then a condition exists whereby a jump in the usual checker-board fashion can be accomplished. However, if the colors are not the same, but different, there can be no movement of the cats.

As shown in FIGS. 11 and 12, both cats 10 and 11 are blue and both are on blue squared 12, hence both objects will be camouflaged so that they are not readily visible. Looking at FIG. 12, a yellow cat 13 appears in a red chek 14 so that the combinations make the cat appear orange and a blue cat 15 on yellow chek 16 makes the cat appear green. If cat 13, a yellow color object, were on blue square 17, it would be green, the same color as cat 15 described previously. Thus a move or jump could be accomplished because of color similarity.

FIGS. 8, 9 and 10 are different colored objects, checker-shaped, transparent and disposed to accomplish the same objective as that achieved by the colored cats or chameleons. When playing in the usual checker-board fashion, the object is to continue jumping and moving in a direction to the other extreme of the board to what is generally designated as king's row. When such a feat FIG. 9, is replaced by a king-like figure 21, shown in FIG. 10. The usual operation of the king takes place as in the usual checker game. It is to be appreciated that throughout the play of the game, the object is to manipulate the colored moving figures (cats and checkers) so as to produce color variations and combinations so designed as to cause movement by one player and stagnation by another player. Further, since more than two players can be engaged, greater participation may be permitted to the enjoyment of a greater number of people.

From the foregoing it may be appreciated that various changes in the structure of the invention, its component parts and mode of operation may be effected without detracting from the true scope and meaning of the invention.

Having described the invention, what is claimed is:
1. A checker-type game comprising,
   (a) a flat transparent supportable surface board,
   (b) a plurality of transparent variously colored squares disposed on said surface in checker-board fashion, and
   (c) a plurality of transparent colored movable objects comparable in color to said colored squares each disposed on said board such that its color blends with or is altered by the color of the square on which it is disposed upon the movement thereof along said surface board colored squares.
2. A checker-type game according to claim 1 and wherein said colored squares are successively red, yellow and blue, respectively disposed along each row of said surface board.
3. A checker-type game according to claim 1 and wherein said colored objects are red, yellow and blue figures each disposed to traverse said surface board along the colored squares thereon to change colors in a prearranged pattern according to the combination of colors of said figure and square.
4. A checker-type game according to claim 3 and wherein said colored objects are disposed to change to orange, purple and green colors when traversing said red, yellow and blue colored squares in a predetermined manner.
5. A checker-type game according to claim 1, and wherein said surface board is collapsible so as to permit folding of board along the central part thereof for transportable purposes.

References Cited

UNITED STATES PATENTS

| | | |
|---|---|---|
| 3,081,088 | 3/1963 | Kast. |
| 3,155,391 | 11/1964 | Chittenden. |
| 3,156,468 | 11/1964 | Hughes _____ 273—136 X |
| 3,179,414 | 4/1965 | Mertz et al. |
| 3,399,895 | 9/1968 | Beach _____ 273—136 X |

ANTON O. OECHSEL, Primary Examiner

U.S. Cl X.R.
273—136, 137